Dec. 5, 1961 H. E. SCHULTZ 3,012,181

TRANSISTOR LOW DRAIN CONVERTER

Filed Dec. 29, 1958

Inventor:
Harry E. Schultz
by [signature]
His Attorney.

United States Patent Office 3,012,181
Patented Dec. 5, 1961

3,012,181
TRANSISTOR LOW DRAIN CONVERTER
Harry E. Schultz, Euclid, Ohio, assignor to General Electric Company, a corporation of New York
Filed Dec. 29, 1958, Ser. No. 783,339
5 Claims. (Cl. 321—2)

This invention relates to a converter circuit using semiconductor devices or transistors for obtaining a higher voltage from a unidirectional source, more particularly a high voltage supply from a low-voltage battery or direct current source.

In its preferred form, the present transistorized converter functions to charge a storage capacitor to a high voltage, for instance several hundred to several thousand volts, from a low-voltage unidirectional source such as a six-volt battery. It is intended particularly as a high voltage power supply for such applications as electronic photoflash units, photo multiplier tubes and geiger tube counters. In such applications, the power supply must maintain a storage capacitor at a high voltage for long periods under no load, that is under conditions where there is substantially no current drain from the storage capacitor. Presently known converter circuits for such applications oscillate continuously and therefore run very inefficiently during the idling or waiting period of supplying only the losses of the storage capacitor. An outstanding characteristic of the present converter is its extremely low current drain during such idling or stand-by periods, the oscillator portions of the circuit being in fact turned off and quiescent during the greater portion of the time.

Accordingly, the primary object of the invention is to provide an improved transistorized converter system for transforming low voltage direct current to high voltage.

Another object of the invention is to provide a converter system for providing a high voltage direct current supply from a low voltage battery and characterized by very low current drain in the stand-by condition.

Other objects and advantages of the present invention will become apparent from the following description thereof as developed in connection with the detailed description of embodiments illustrating its principles. The features of the invention believed to be novel are particularly pointed out in the appended claims.

Figure 1:
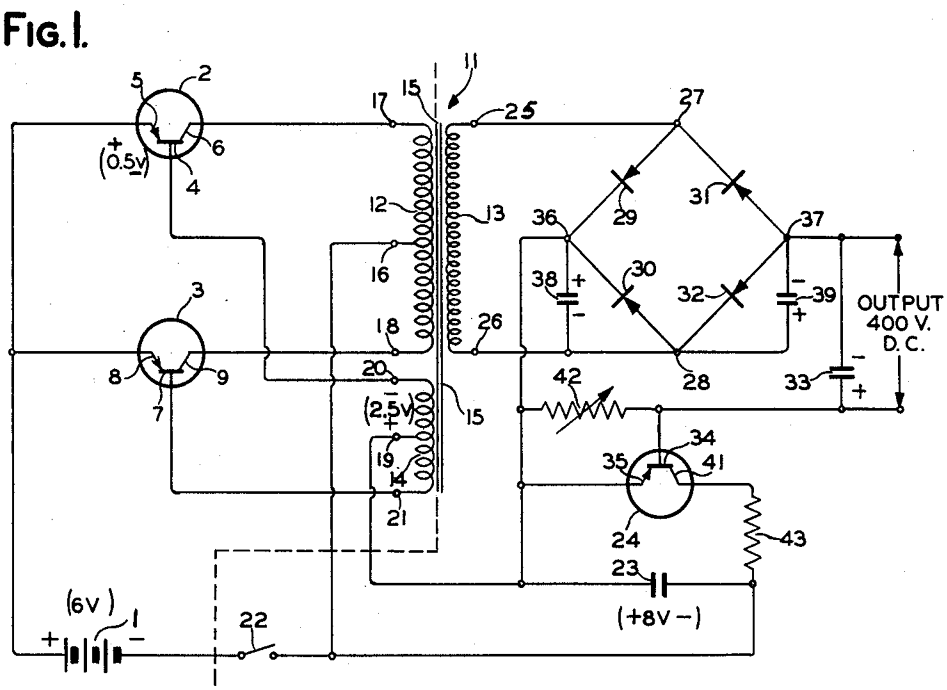
FIG. 1 is a schematic circuit diagram of a transistor converter system in accordance with the present invention.

Referring now to the drawings wherein like reference numbers designate corresponding elements to both views, and with particular reference to FIG. 1, there is provided a suitable source 1 of direct current which may conveniently be a six-volt battery.

The converter circuit includes a pair of semi-conductive switching devices or power transistors 2, 3. These transistors may suitably be of the junction type wherein a body of semiconducting materials such as silicon or germanium is provided with three distinct regions by means of controlled impurities to establish rectifying junctions between regions of opposite conductivity types. Suitable contacts are made to the terminal regions to provide the emitter and collector electrodes and a low-resistance contact is made to the semiconducting body to provide the base electrode. By applying a forward bias to the emitter-base junction (making the base electrode negative with respect to the emitter electrode in the case of a p-n-p transistor) a saturated condition of the transistor occurs wherein the resistance between emitter and collector electrodes become relatively small. By applying a reverse or back bias between emitter and base electrodes, the transistor is cut off and the resistance between emitter and collector electrodes becomes relatively large.

The transistors 2, 3 symbolically illustrated are of the p-n-p junction type with the transistor 2 having a base electrode 4, emitter electrode 5 and collector electrode 6, and the transistor 3 having base electrode 7, emitter electrode 8 and collector electrode 9.

As illustrated, the converter circuit comprises a transformer 11 having a low voltage primary winding 12, a high-voltage secondary winding 13, and a low-voltage auxiliary winding 14 which link a saturable magnetic core 15. Preferably magnetic core 15 has a rectangular hysteresis loop characteristic and is designed for saturation within the range of energization of primary winding 12. Primary winding 12 is center-tapped at 16 and has opposed sections between the center tap and outer terminals 17 and 18. Likewise winding 14 has a center tap 19 and is provided with opposed winding sections between the center tap and outer terminals 20 and 21. The positive side of battery 1 is connected to terminal 17 of primary winding 12 through the emitter-collector electrode path of transistor 2 and to terminal 18 through the emitter-collector path of transistor 3. The negative side of the battery is connected through on-off switch 22 to center tap 16. Thus the opposed sections of the primary winding are connected for energization from the source 1 through transistors 2 and 3 respectively.

Feedback connections are provided from outer terminal 20 of auxiliary winding 14 to the base electrode 4 of transistor 2, and from outer terminal 21 to base electrode 7 of transistor 3. The winding polarities of the primary and auxiliary windings are such that when an increasing current flows from terminal 17 to center tap 16 in the primary winding, the voltage induced in the auxiliary winding is negative at terminal 20 with respect to center tap 19. The circuit from the center tap 19 of auxiliary winding 14 to switch 22 and the negative side of battery 1 is completed through a control capacitor 23 or control transistor 24 whose functions will be explained shortly.

High voltage secondary winding 13 has its terminals 25, 26 connected across diagonal input points 27, 28 of a bridge rectifier comprising silicon rectifiers 29 to 32. A main output storage capacitor 33 is connected in series with the base electrode 34 and emitter electrode 35 of a control transistor 24 across diagonal output points 36 and 37 of the bridge. Auxiliary storage capacitors 38 and 39 are connected from points 36 and 37 respectively to point 28 to permit a voltage doubling effect whereby to charge main output storage capacitor 33 to twice the peak-to-peak voltage of secondary winding 13.

It will be observed that the charging current from the bridge rectifier to main storage capacitor 33 is in a direction to develop a forward bias across the emitter-base junction of control transistor 24, that is it makes the base negative with respect to the emitter. Therefore the transistor is turned on for a low resistance path between emitter electrode 35 and collector electrode 41. An adjustable resistor 42 connected between emitter and base electrodes permits shunting a desired proportion of the charging current to the main storage capacitor in order to reduce the load on the control transistor. The emitter-collector path of control transistor 24 is connected in series with current limiting resistor 43 across control capacitor 23.

In operation, power transistors 2 and 3 acting on primary winding 12 and in conjunction with the feedback provided by auxiliary winding 14 operate in known fashion as a ferro-resonant oscillator. When switch 22 is first closed, one of power transistors 2 and 3 (due to the fact that they cannot be absolutely identical) will begin to pass current from emitter to collector electrode at a greater rate than the other. Assuming that transistor 2 initially passes current at a greater rate, then current flow from terminal 17 to center tap 16 of primary winding 12 determines the induced voltage in auxiliary winding 14. This induced voltage is in a direction to apply a negative going voltage to base electrode 4 of transistor 2 thereby lowering the emitter-collector resistance of that transistor, and a positive going potential to base electrode 7 of transistor 9, thereby increasing the emitter-collector resistance of that transistor. The lowered emitter-collector resistance of transistor 2 entails a further increase in current from terminal 17 to center tap 16 of the primary winding, thus achieving a self-generating process which quickly drives transistor 2 to saturation and transistor 3 to cutoff.

The above-described condition endures until the core 15 of transformer 11 begins to enter saturation. When this occurs, there can be substantially no further increase in the magnetic flux in core 15 so that voltages are no longer induced in auxiliary winding 14 and both transistors 2 and 3 momentarily become substantially nonconducting. Since current is no longer flowing in primary winding 12, the flux in core 15 begins to collapse. Thereupon a reverse voltage is induced in auxiliary winding 14 which tends to be positive at base electrode 4 of transistor 2 and negative at base electrode 7 of transistor 3. Thus the process is now reversed and transistor 3 is driven to saturation whereas transistor 2 is driven to cutoff. This condition now endures until core 15 arrives at saturation in the reverse direction, whereupon another reversal takes place. Thus, neglecting for the moment the effect of control capacitor 23 and control transistor 24, an alternating voltage of substantially rectangular wave pattern is developed in transformer 11. The period of each half-cycle of this alternating voltage is proportional to the time required for the core 11 to become saturated after each reversal of the conducting conditions of transistors 2 and 3.

An alternating voltage of rectangular wave pattern is likewise induced in secondary winding 13. The bridge rectifier initially supplies charging current directly to main output storage capacitor 33 through the emitter-base electrode path of control transistor 24 or through variable resistor 42 shunting it. When main storage capacitor 32 has become charged up to the secondary output voltage of winding 13, voltage doubling action through auxiliary capacitors 38 and 39 begins and carries the charge across main storage capacitor 33 up to twice the secondary peak-to-peak output voltage.

Control capacitor 23 and transistor 24 provide a control loop which operates to shut off both power transistors 2 and 3 when main storage capacitor 33 is fully charged and which further insures periodic sampling to maintain the charge across capacitor 33. It operates in the following fashion. Neglecting for the moment the effect of control transistor 24, it is seen that the emitter-base forward biasing current of whichever one of transistors 2 and 3 happens to be conducting causes control capacitor 23 to become charged to a voltage which is greater than the source 1 voltage. The final voltage across capacitor 23 in fact will be equal to the source 1 voltage, plus the voltage induced in either opposed winding of auxiliary winding 14, less the emitter to base voltage drop of transistor 2 or 3. For instance, assume that the battery voltage is 6 volts, the emitter to base voltage drop of transistors 2 or 3 is 0.5 volt, and the voltage induced in either opposed winding section of auxiliary winding 14 is 2.5 volts, as indicated in the drawing by the numerals in parentheses. Then, provided transistor 24 is not turned on, capacitor 23 will charge up to 8 volts whereupon both transistors 2 and 3 will be turned off and oscillations will cease. However the emitter-collector electrode path of control transistor 24 in series with current limiting resistor 43 shunts control capacitor 23. The emitter-base junction of the control transistor is biased forwardly as long as charging current is flowing to main storage capacitor 33. As a result, control transistor 24 prevents any substantial charge from developing across control capacitor 23 so long as charging current is flowing to the main storage capacitor. In other words, the emitter-base current of power transistors 2 and 3 flows through the emitter-collector path of control transistor 24 so long as charging current is flowing to main storage capacitor 33, thereby allowing oscillations to continue.

When main storage capacitor 33 has become fully charged, current flow in the emitter to base path of control transistor 24 ceases so that the transistor is turned off and charge now increases across control capacitor 23. The increased charge across the control capacitor biases off power transistors 2 and 3 so that oscillations temporarily cease. This condition endures until the charge across control capacitor 23 has leaked off to a value less than the battery voltage. The leaking off is due to leakage currents through the emitter-collector path of control transistor 24 and leakage currents through the emitter-base path of power transistors 2 and 3. Current in the forward direction from the emitter to base of power transistors 2 and 3 then starts again and causes the oscillator to start oscillating. If, when the oscillator starts, the main storage capacitor draws charging current, control transistor 24 is turned on to sustain the oscillations until the storage capacitor is fully charged again. However if, when the oscillator starts, main storage capacitor 33 does not draw current, control transistor 24 remains cut off. Oscillations start, but after the first few cycles of the oscillator, the charge across control capacitor 23 is restored and the oscillator is cut off again. The process of turning the oscillator on for a few cycles and then shutting it off in the absence of charging current to the main storage capacitor is repeated at a rate dependent upon the size of capacitor 23 and the leakage currents which it supplies. It will also be observed that if the main storage capacitor 33 discharges suddenly due to load conditions, auxiliary charging capacitors 38 and 39 will discharge into the main storage capacitor. This discharge current is likewise effective to turn on control transistor 24 and cause the oscillator to start immediately.

With this mode of operation, the oscillator is turned on only when load conditions require it, or otherwise momentarily only at spaced intervals for the sampling cycles. Thus battery requirements are reduced to a minimum. In a converter actually constructed in accordance with the invention and tested, and producing a 400 volt D.C. output from a six-volt battery, the current drain from the battery under no load stand-by conditions was less than one milliampere. The following circuit constants were used and they are listed herein by way of example and not in order to limit the invention thereto:

| | |
|---|---|
| Transistors 2, 3 | 2N256. |
| Transistor 24 | 2N44. |
| Rectifiers 29 to 32 | 1N1695. |
| Transformer: | |
| Primary 12 | 200 turns No. 27 wire, center-tapped. |
| Secondary 13 | 3,750 turns No. 38 wire. |
| Auxiliary 14 | 110 turns No. 30 wire, center-tapped. |
| Resistor 43 | 33 ohms. |
| Resistor 42 | 0–1000 ohms. |
| Capacitors 38, 39 | 0.1 michrofarad. |
| Capacitor 33 | 20 microfarads. |
| Capacitor 23 | 5 microfarads. |
| Battery 1 | 6 volts. |

Figure 2:
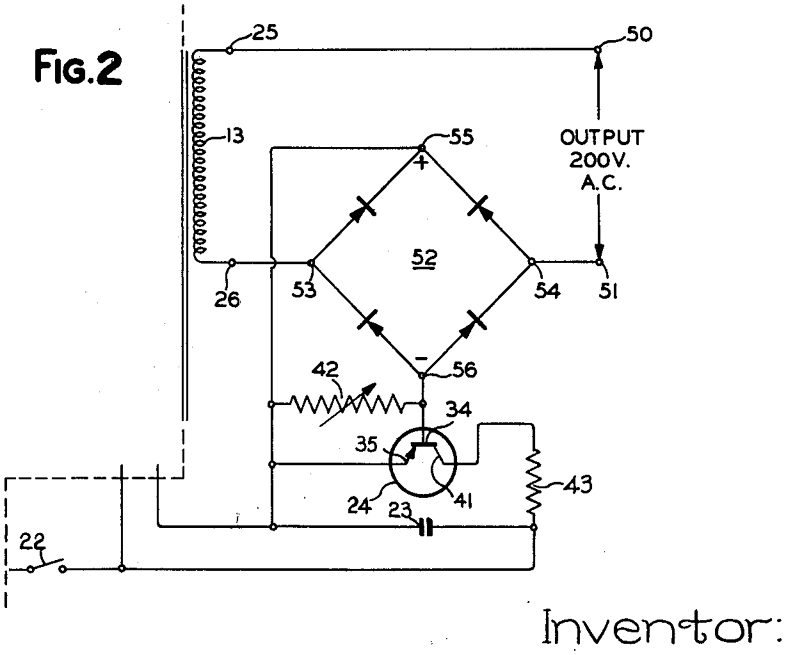
FIG. 2 is a schematic circuit diagram of a modified form of converter circuit illustrating a variant of the invention.

While the invention finds its most promising applications in a D.C. to D.C. converter, it may also be used in a D.C. to A.C. converter as illustrated in FIG. 2. By way of example, this converter may be used to supply a 200 volt A.C. square wave output from a 6 volt battery.

With this modification, in order to effectuate the control loop function, the A.C. current supplied to the load at output terminals 50, 51 must be translated into a corresponding D.C. component. This is effectuated by connecting terminal 25 of secondary winding 13 directly to output terminal 50 and by interposing bridge rectifier 52 between secondary terminal 26 and output terminal 51. Bridge rectifier 52 is a conventional four-element bridge allowing alternating current to flow between diagonal input points 53, 54 whereupon a corresponding rectified current flows between diagonal output points 55, 56 with the polarity indicated in the drawing. Output points 55 and 56 are joined by the emitter-base electrode path of control transistor 24 which path is shunted as before by variable resistor 42. The remaining elements and connections of the circuit are identical to those of FIG. 1.

In the operation of the circuit of FIG. 2, the sampling operation whereby the oscillator is turned on for a few cycles at periodic intervals, for instance 10 times per second, occurs in the same fashion as has been previously described with reference to FIG. 1. However unless a load is connected across terminals 50, 51 the oscillations are cut off immediately after the sampling cycle and no further oscillations occur until the next sampling cycle. When a load is connected, as soon as a sampling cycle occurs, load current passing through rectifier 52 biases control transistor 24 in the forward direction. This allows current to flow through the emitter-collector circuit of transistor 24, which current is drawn through the emitter-base electrode path of transistors 2 and 3 and holds the oscillator on. As soon as the load is removed from output terminals 50, 51 control transistor 24 is shut off and in turn shuts off power transistors 2 and 3 so that oscillations cease except for the periodic sampling.

It will be understood that the component values and specific type of transistors which have been shown herein are intended for illustrative purposes only and that these may be changed or varied without departing from the principles of the invention. It will also be obvious that whereas the invention has been described using p-n-p type transistors, n-p-n type transistors may equally well be used with appropriate modifiecation of the source potential with respect to the other circuit elements. The appended claims are therefore intended to cover any such modifications coming within the true spirit and scope of the invention.

What is claimed as new and desired to be secured by Letters Patent of the United States is:

1. A converter system comprising an oscillator circuit including a transformer having primary, secondary, and auxiliary windings on a saturable magnetic core, a pair of power transistors each having emitter, base, and collector electrodes, connections for energizing said primary winding from a direct current source through the emitter-collector electrode path of one or the other of said power transistors to effect magnetic saturation of said core in opposite directions, feedback connections from said auxiliary winding to the base electrodes of said power transistors for alternately switching on and off one or the other of said power transistors, an output circuit comprising said secondary winding for supplying a load and including a rectifier circuit responsive to load current, a control transistor having emitter, base and collector electrodes, said rectifier circuit being connected to the emitter-base electrode path of said control transistor for turning on said control transistor in response to load current flow, and a control loop for said power transistors including the emitter-base electrode paths of said power transistors and the emitter-collector electrode path of said control transistor allowing forward biasing emitter-base current flow in said power transistors when said output circuit is supplying current to a load, and a control capacitor shunting the emitter-collector electrode path of said control transistor and serving to hold said power transistors normally biased off in the absence of load current flow except for sampling occurrences at time intervals governed by the leakage of charge from said control capacitor.

2. A converter system comprising a direct current source, an oscillator circuit including a transformer having a primary winding with opposed sections, a secondary winding, and an auxiliary winding with opposed sections on a saturable magnetic core, a pair of power transistors each having emitter, base, and collector electrodes, said primary winding having its opposed sections connected for enenrgization from said source through the emitter-collector electrode paths of said power transistors to effect magnetic saturation of said core in opposite directions, feedback connections from the opposed sections of said auxiliary winding to the base electrodes of said power transistors for applying the voltages induced in said auxiliary winding to alternately switch on and off one or the other of said power transistors, an output circuit comprising said secondary winding for supplying a load and including a rectifier circuit responsive to load current, a control transistor having emitter, base and collector electrodes, said rectifier circuit being connected to the emitter-base electrode path of said control transistor for turning on said control transistor when said output circuit is supplying current to the load, and a control loop for said power transistors including said source, the emitter-base electrode path of said power transistors each in series with an opposed section of said auxiliary winding, and the emitter-collector electrode path of said control transistor allowing forward biasing emitter-base current flow in said power transistors in response to load current flow.

3. A converter system comprising a direct current source, an oscillator circuit including a transformer having a primary winding with opposed sections, a secondary winding, and an auxiliary winding with opposed sections on a saturable magnetic core, a pair of power transistors each having emitter, base, and collector electrodes, said primary winding having its opposed sections connected for energization from said source through the emitter-collector electrode path of said power transistors to effect magnetic saturation of said core in opposite directions, feedback connections from the opposed sections of said auxiliary winding to the base electrodes of said power transistors for applying the voltages induced in said auxiliary winding to alternately switch on and off one or the other of said power transistors, a control transistor having emitter, base and collector electrodes, a unidirectional output circuit comprising said secondary winding connected across a rectifier circuit supplying a storage capacitor in series with the emitter-base electrode path of said control transistor, current flow to said storage capacitor providing forward biasing emitter-base current in said control transistor, and a control loop for said power transistors including said source, the emitter-base electrode path of said power transistors each in series with an opposed section of said auxiliary winding, and the emitter collector electrode path of said control transistor thereby allowing forwarding biasing emitter-base current flow in said power transistors in response to current flow to said storage capacitor.

4. A converter system comprising a direct current source, an oscillator circuit including a transformer having a primary winding with opposed sections, a secondary winding, and an auxiliary winding with opposed sections on a saturable magnetic core, a pair of power transistors each having emitter, base, and collector electrodes, said primary winding having its opposed sections connected for energization from said source through the emitter-collector electrode path of said power transistors to effect magnetic saturation of said core in opposite directions, feedback connections from the opposed sections of said auxiliary winding to the base electrodes of said power transistors for applying the voltages induced in said auxiliary winding to alternately switch on and off one or the other of said power transistors, a control transistor having emitter, base and collector electrodes, a unidirectional output circuit comprising said secondary winding connected across a rectifier circuit supplying a storage capacitor in series with the emitter-base electrode path of said control transistor, current flow to said storage capacitor providing forward biasing emitter-base current in said control transistor, and a control loop for said power transistors including said source, the emitter-base electrode path of said power transistors each in series with an opposed section of said auxiliary winding, and the emitter collector electrode path of said control transistor thereby allowing forward biasing emitter-base current flow in said power transistors in response to current flow to said storage capacitor, and a control capacitor shunting the emitter-collector electrode path of said control transistor and serving to hold said power transistors normally biased off in the absence of current flow to said storage capacitor except for sampling occurrences at time intervals governed by the leakage of charge from said control capacitor.

5. A converter system comprising a direct current source, an oscillator circuit including a transformer having a primary winding with opposed sections, a secondary winding, and an auxiliary winding with opposed sections on a saturable magnetic core, a pair of power transistors each having emitter, base, and collector electrodes, said primary winding having its opposed sections connected for energization from said source through the emitter-collector electrode path of said power transistors to effect magnetic saturation of said core in opposite directions, feedback connections from the opposed sections of said auxiliary winding to the base electrodes of said power transistors for applying the voltages induced in said auxiliary winding to alternately switch on and off one or the other of said power transistors, a control transistor having emitter, base and collector electrodes, an alternating current output circuit comprising said secondary winding connected in series with a bridge rectifier to output terminals, said bridge rectifier having connections supplying direct current through the emitter-base electrode path of said control transistor, alternating current flow to said output terminals providing forward biasing emitter-base current in said control transistor, and a control loop for said power transistors including said source, the emitter-base electrode path of said power transistors each in series with an opposed section of said auxiliary winding, and the emitter collector electrode path of said control transistor thereby allowing forward biasing emitter-base current flow in said power transistors in response to alternating current flow to said output terminals.

References Cited in the file of this patent

UNITED STATES PATENTS

| | | |
|---|---|---|
| 2,783,384 | Bright et al. | Apr. 6, 1954 |
| 2,854,615 | Light | Sept. 30, 1958 |
| 2,944,191 | Kapteyn | July 5, 1960 |

OTHER REFERENCES

Tomer, Bud: "Transistor Power Supplies;" a publication of CBS Hystrom, 6 pages, October 15, 1957.

Hamlin, Bill: "Transistor Power Convertors;" CQ, May 1958, pages 42 and 43.